(12) United States Patent
Cartoon et al.

(10) Patent No.: US 9,875,245 B2
(45) Date of Patent: Jan. 23, 2018

(54) CONTENT ITEM RECOMMENDATIONS BASED ON CONTENT ATTRIBUTE SEQUENCE

(71) Applicant: Apple Inc., Cupertino, CA (US)

(72) Inventors: Daniel Cartoon, South San Francisco, CA (US); Mark H. Levy, Winchester (GB)

(73) Assignee: APPLE INC., Cupertino, CA (US)

( * ) Notice: Subject to any disclaimer, the term of this patent is extended or adjusted under 35 U.S.C. 154(b) by 462 days.

(21) Appl. No.: 14/684,063

(22) Filed: Apr. 10, 2015

(65) Prior Publication Data

US 2016/0299906 A1    Oct. 13, 2016

(51) Int. Cl.
*G06F 17/30* (2006.01)
(52) U.S. Cl.
CPC .............................. *G06F 17/30053* (2013.01)
(58) Field of Classification Search
CPC ................................................ G06F 17/30053
See application file for complete search history.

(56) References Cited

U.S. PATENT DOCUMENTS

| 8,090,606 | B2 | 1/2012 | Svendsen |
| 8,175,989 | B1 | 5/2012 | Gopinath et al. |
| 8,542,982 | B2* | 9/2013 | Eggink ............... G11B 27/034 386/285 |
| 8,642,872 | B2 | 2/2014 | Lu et al. |
| 8,676,816 | B2* | 3/2014 | Kamimaeda ...... G06F 17/30867 707/749 |
| 8,903,843 | B2 | 12/2014 | Farrelly |
| 2005/0038819 | A1* | 2/2005 | Hicken ............ G06F 17/30743 |
| 2008/0256100 | A1* | 10/2008 | van de Sluis ..... G06F 17/30749 |
| 2009/0063414 | A1* | 3/2009 | White ............... G06F 17/30017 |
| 2011/0295843 | A1 | 12/2011 | Ingrassia et al. |
| 2012/0185070 | A1* | 7/2012 | Hagg ................ G06F 17/30053 700/94 |

* cited by examiner

*Primary Examiner* — Kris Mackes
(74) *Attorney, Agent, or Firm* — Polsinelli PC

(57) ABSTRACT

User created playlists can be analyzed to create a statistical language model indicating the likelihood that a particular sequence of content attributes will be found in a playlist created by a user, as well as the likelihood of any sequence of one or more content attributes following a playlist or partial playlist created by a user. The language model can be used to generate a recommended content attribute sequence based on a partial playlist of one or more content items. A recommended content item sequence that will be pleasant to a user when added to the partial playlist can be selected based on the recommended content attribute sequence.

21 Claims, 11 Drawing Sheets

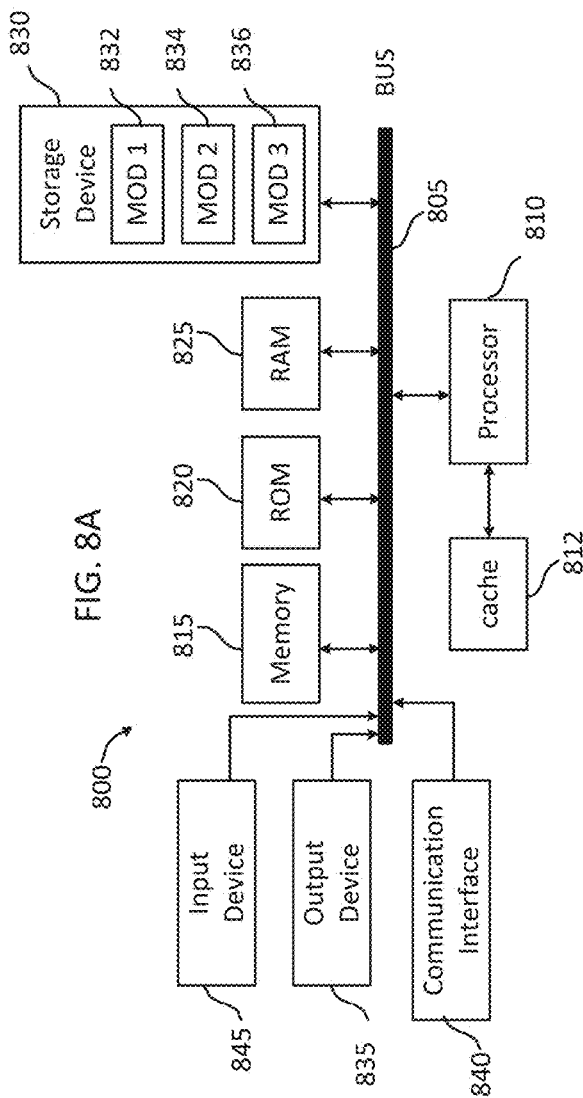
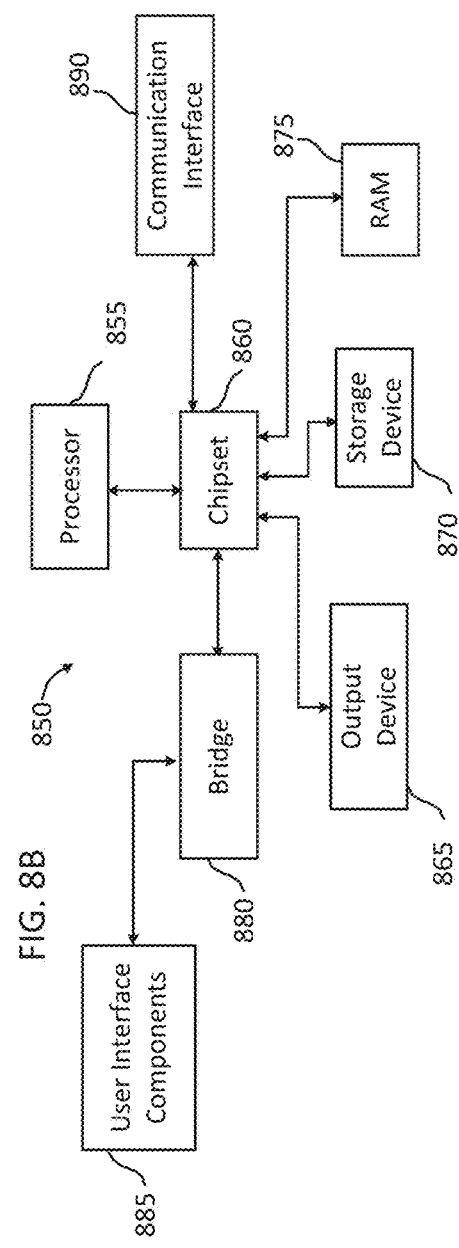
FIG. 8A
FIG. 8B

CONTENT ITEM RECOMMENDATIONS BASED ON CONTENT ATTRIBUTE SEQUENCE

TECHNICAL FIELD

The present technology pertains to recommending content items, and more specifically pertains to recommending content items based on content attribute sequence.

BACKGROUND

With the advent of digital content players and other types of mobile computing devices, people are accumulating vast libraries of digital content. In many cases, personal content libraries include songs, movies, etc., added from physical media such as CD, SACD, and DVD as well as content downloaded from online content retailers. While mobile computing devices allow users to enjoy their content virtually anywhere, growing content libraries are becoming more and more difficult to effectively manage. One common way users attempt to effectively manage their content library is to create a playlist consisting of a set of content items selected by a user to be performed in a specified order.

Handcrafting a playlist typically involves the tedious process of searching through a large content library to find appropriate content items, selecting the content items, selecting an order for the content items and hoping that no desirable content items are overlooked. Current technologies enable users to automatically generate a playlist based on common factors, such as genre, artist, album, popularity and the like. While simple and fast to create, these automatically generated playlists select content individually without taking into consideration how the content items fit together and whether they will create a cohesive playlist that flows well from one content item to the next in a manner that is pleasant for the user. As a result, automatically generated playlists may include content items that the user likes, however result in a poor playlist when put together.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for recommending a sequence of content items to complete a partial playlist. When creating a playlist, users generally attempt to select a sequence of content items that flow well from one content item to the next in a manner that is pleasant for the user. Users generally make these determinations based on the content attributes of the content items. For example, a user creating a playlist of songs may select songs with tempos, styles, moods, etc., that flow well from one song to the next.

An analysis of user created playlists can be used to determine the likelihood that a particular sequence of content attributes (e.g., happy-bouncy-happy-soft-elegant) will be found in a playlist created by a user, as well as the likelihood of any sequence of one or more content attributes following a playlist or partial playlist created by a user. For example, the analysis of a training set of playlists can be used to create a statistical language model based on the content attributes of the content items in the playlists as well as the sequential order of the content items in the playlists. The language model can be used to generate a recommended content attribute sequence based on a partial playlist of one or more content items. The recommended content attribute sequence can identify a sequence of content attributes that are likely to follow the partial playlist.

A training set of playlists can be a large catalog of playlists such as those created by many users in a population of users of an online music service, or it could be limited to playlists that include items of a predominate genre, or the training set could be limited to playlists created by editors, or playlists that have received positive social media feedback. Whatever the training set of playlists a machine learning algorithm such a recurrent neural network can be used to create a language model representing the probabilities that a content items having one content attribute will follow a partial playlist of selected content items.

The content management system can use the recommended content attribute sequence to generate a recommended sequence of one or more content items that will be pleasant to a user when added to the partial playlist. For example, the content management system can select content items based on the content attributes identified by the recommended content attribute sequence and order the selected content items according to the recommended content attribute sequence. For example, if the recommended content attribute sequence identifies a happy content item, followed by a bouncy content item, followed by another happy content item, the content management system can generate the recommended sequence of content items by selecting two happy content items and one bouncy content item and then ordering them according the recommended content attribute sequence (e.g., happy-bouncy-happy).

BRIEF DESCRIPTION OF THE DRAWINGS

The above-recited and other advantages and features of the disclosure will become apparent by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIGS. 8A and 8B show exemplary possible system embodiments.

DESCRIPTION

Figure 1:
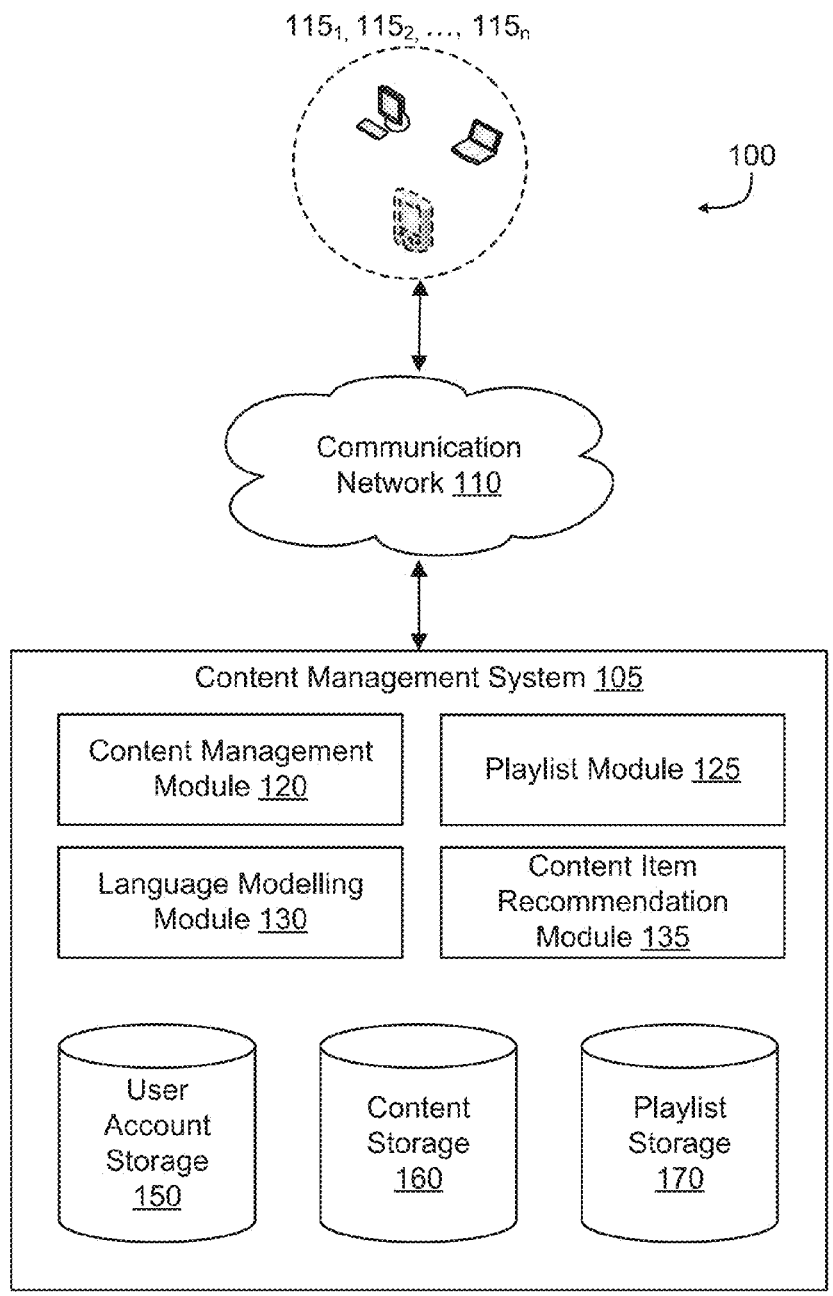
FIG. 1 shows an exemplary configuration of devices and a network in accordance with the invention.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for recommending a sequence of content items to complete a partial playlist. When creating a playlist, users generally attempt to select a sequence of content items that flow well from one content item to the next in a manner that is pleasant for the user. Users generally make these determinations based on the content attributes of the content items. For example, a user creating a playlist of songs may select songs with tempos, styles, moods, etc., that flow well from one song to the next. Besides considering the flow from one item to the next, users may also frequently care about an "arc" of attributes over the broader course of a playlist, for example by selecting songs that get gradually faster over the course of a long sequence.

An analysis of a training set of user created playlists can be used to determine the likelihood that a particular sequence of content attributes (e.g., happy-bouncy-happy-soft-elegant) will be found in a playlist created by a user, as well as the likelihood of any sequence of one or more content attributes following a playlist or partial playlist created by a user. For example, the analysis of training set of the user created playlists can be used to create a statistical language model based on the content attributes of the content items in the playlists as well as the sequential order of the content items in the playlists. The language model can be used to generate one or more recommended content attribute sequences based on a partial playlist of one or more content items. A recommended content attribute sequence can identify a sequence of content attributes that are likely to follow the partial playlist. The sequence of content attributes can describe content attributes of one or more content items that are likely to follow the partial playlist.

The content management system can use the recommended content attribute sequence to generate a recommended sequence of one or more content items that will be pleasant to a user when added to the partial playlist. For example, the content management system can select content items based on the content attributes identified by the recommended content attribute sequence and order the selected content items according to the recommended content attribute sequence. For example, if the recommended content attribute sequence identifies a happy content item, followed by a bouncy content item, followed by another happy content item, the content management system can generate the recommended sequence of content item by selecting two happy content items and one bouncy content item and then ordering them according to the recommended content attribute sequence (e.g., happy-bouncy-happy) that is determined based on a language model.

FIG. 1 illustrates an exemplary system configuration 100, wherein electronic devices communicate via a network for purposes of exchanging content and other data. As illustrated, multiple computing devices can be connected to communication network 110 and be configured to communicate with each other through use of communication network 110. Communication network 110 can be any type of network, including a local area network ("LAN"), such as an intranet, a wide area network ("WAN"), such as the internet, or any combination thereof. Further, communication network 110 can be a public network, a private network, or a combination thereof. Communication network 110 can also be implemented using any number of communication links associated with one or more service providers, including one or more wired communication links, one or more wireless communication links, or any combination thereof. Additionally, communication network 110 can be configured to support the transmission of data formatted using any number of protocols.

Multiple computing devices can be connected to communication network 110. A computing device can be any type of general computing device capable of network communication with other computing devices. For example, a computing device can be a personal computing device such as a desktop or workstation, a business server, or a portable computing device, such as a laptop, smart phone, or a tablet PC. A computing device can include some or all of the features, components, and peripherals of computing device 500 of FIGS. 5A and 5B.

To facilitate communication with other computing devices, a computing device can also include a communication interface configured to receive a communication, such as a request, data, etc., from another computing device in network communication with the computing device and pass the communication along to an appropriate module running on the computing device. The communication interface can also be configured to send a communication to another computing device in network communication with the computing device.

In system 100, a user can interact with content management system 105 through client devices $115_1$, $115_2$, ..., $115_n$ (collectively "115") connected to communication network 110 by direct and/or indirect communication. Content management system 105 can be comprised of one or more computing device configured to manage content items for a plurality of users. Content management system 105 can support connections from a variety of different types of client devices 115, such as desktop computers; mobile computers; mobile communications devices (e.g. mobile phones, smart phones, tablets, etc.); smart televisions; set-top boxes; and/or any other network enabled computing devices. Client devices 115 can be of varying type, capabilities, operating systems, etc. Furthermore, content management system 105 can concurrently accept connections from and interact with multiple client devices 115.

A user can interact with content management system 105 via a client-side application installed on client device $115_i$. In some embodiments, the client-side application can include a content management system specific component. For example, the component can be a stand-alone application, one or more application plug-ins, and/or a browser extension. However, the user can also interact with content management system 105 via a third-party application, such as a web browser, that resides on client device $115_i$ and is configured to communicate with content management system 105. In either case, the client-side application can present a user interface (UI) for the user to interact with content management system 105. For example, the user can interact with content management system 105 via a client-side application integrated with the file system or via a webpage displayed using a web browser application.

Content management system 105 can be configured to manage content items for multiple user accounts. For example, content management system 105 can allow users to purchase, store and access content items. Furthermore, content management system 105 can make it possible for a user to access the content items from multiple client devices 115. Accessing a content item can include receiving metadata describing the content item, streaming the content item from content management system 105 and/or downloading the content item to one of client devices 115.

To facilitate the various content management services, a user can create a user account with content management system 105. The account information for each created user account can be maintained in user account storage 150. User account storage 150 can store profile information for each user account, including a unique account identifier identifying the user account, personal information, username, password, email address, home address, credit card information, banking information, etc. User account storage 150 can also include account management information, such as content storage locations, security settings, personal configuration settings, client devices authorized to access the user account, etc.

A user account can be used to purchase, manage and store content items, such as digital data, documents, text files, audio files, video files, etc. For example, content management system 105 can provide an online content retail interface where users can purchase a variety of content items. Further, in some embodiments, a user can upload content items from one of client devices 115 to content management system 105. The purchased and uploaded content items can be assigned to the user's account and then accessed by the user from any of client devices 115. For example, a content item identifier identifying each content item assigned to a user account can be stored in user account storage 150 and associated with the corresponding user account. The content item identifier can be used to identify the content item as well as the location of the content item.

The content items can be stored in content storage 160. Content storage 160 can be a storage device, multiple storage devices, or a server. Alternatively, content storage 160 can be a cloud storage provider or network storage accessible via one or more communications networks. Content management system 105 can hide the complexity and details regarding storage of the content items from client devices 115 such that the location of the content items stored by content management system 105 is not known by client devices 115. Content management system 105 can store the content items in a network accessible storage (SAN) device, in a redundant array of inexpensive disks (RAID), etc. Content storage 160 can store content items using one or more partition types, such as FAT, FAT32, NTFS, EXT2, EXT3, EXT4, ReiserFS, BTRFS, and so forth.

Content storage 160 can also store metadata describing content items, content item types, and the relationship of content items to various user accounts. The metadata for a content item can be stored as part of the content item or can be stored separately. In one variation, each content item stored in content storage 160 can be assigned a system-wide unique identifier.

Content management system 105 can include content management module 120 configured to manage and access each user account and the content items assigned to the user accounts. For example, content management module 120 can be configured to communicate with user account storage 150 and content storage 160 to adjust privileges with respect to content items and otherwise manage content items.

Upon a user logging into their user account from one of client devices 115, content management module 120 can access the account information associated with the user account to identify the content items assigned to the user account, as well as account configuration data dictating presentation of the content items. Content management module 120 can then present and/or provide the content items to the user according to the account configuration data. For example, content management module 120 can access a user account to identify the content item identifiers assigned to the user account. The content item identifier can then be used to identify and locate the content items assigned to the user account, which can be presented according to the account configuration data.

Presenting the content items can include transmitting metadata describing the content items to client device $115_i$ that was used to access the user account. Client device $115_i$ can then use the received metadata to present the content items that the user account can access. For example, client device $115_i$ can present information identifying the content items available to the user account in a content item library. This can include presenting the title of the content items, images such as an album or book cover, description of the content item, etc.

Content management system 105 can further enable users to create and play playlists. A playlist can be made up of a set of content items ordered sequentially to be performed in the specified order. For example, a playlist can include multiple songs selected by a user to be played in a specified sequential order such that upon performance of a first song in the playlist completing, performance of the next song ordered in the playlist begins.

A playlist can be comprised of any type or combination of types of content items, such as songs, movies, television shows, videos, books, audio files, etc. For example, a playlist can include content items of a single type, such as a playlist including only songs. Alternatively, a playlist can include content items of multiple types, such as a playlist including songs and videos.

Content management system 105 can include playlist storage 170 configured to maintain multiple playlist records. Each playlist record can correspond to a single playlist and include data defining the playlist. For example, a playlist record can include a list of content item identifiers that identify the content items included in the playlist. A playlist record can also identify a sequential order for the content items in the playlist. For example, a playlist record can be an array, linked list, or other data object which lists or maintains the content item identifiers in the sequential order in which their corresponding content items are ordered in the playlist.

Alternatively, each content item identifier included in a playlist record can be associated with an order value indicating the corresponding content item's position within the playlist. For example, the content item positioned first in the playlist can have an order value of 1, the content item positioned second in the playlist can have an order value of 2 and so on.

A playlist record can also include a playlist identifier that identifies a playlist. The playlist identifier for a playlist created and/or added by a user can be assigned to the user's account in user account storage 150 and be used to identify and present the playlist to the user when the user logs in to their account. Further, a playlist record can include a playlist name for the playlist, such as a name provided by the creator of the playlist. The name can be presented along with the playlist to help a user identify the playlist. In some embodiments, the name of a playlist can be named for an attribute exemplified by the content of the playlist, such as My Happy Playlist" or "My Sad Playlist."

Content management system 105 can also include playlist module 125 configured to create playlists. For example, playlist module 125 can receive input from a user that identifies content items that the user would like to add to a playlist as well as a specified sequential order for the content items in the playlist. Playlist module 125 can generate a playlist record in playlist storage 170 corresponding to the user's selections. For example, playlist module 125 can create a new playlist record and add the content item identifiers corresponding to the user's selections to the playlist record.

In addition to creating a new playlist, playlist module 125 can further enable a user to modify an existing playlist. For example, playlist module 125 can receive an input from a user identifying an existing playlist. Playlist module 125 can then identify the corresponding playlist record in playlist storage 170 and present the user with the content items in the playlist as well as their corresponding order. Playlist module 125 can then receive input from the user identifying modifications to the playlist, such as changing the order of the content items, adding new content items, removing content items, etc. Playlist module 125 can then modify the corresponding playlist record to reflect the user's selected modifications.

To enable a user to create and/or modify a playlist, playlist module 125 can provide users with a playlist interface enabling a user to create a new playlist, modify an existing playlist, add content items to a playlist, remove content items from a playlist, select or change a sequential order for a playlist, name a playlist, etc. For example, the playlist interface can present a user with a content library identifying content items assigned to the user's account and a playlist library identifying the playlists assigned to the user's account. The playlist interface can further enable the user to select content items from the content library to add to a new or existing playlist, select content items to remove from a playlist, as well as select and/or arrange the order of the content items within a playlist.

Content management system 105 can further be configured to select and/or recommend content items to add to a seed playlist based on the content items included in the seed playlist and/or the sequential order of the seed playlist. A seed playlist can be comprised of one or more content items in a specified sequential order. A seed playlist can be a partial playlist selected or created by a user. For example, playlist module 140 can enable a user to select an existing playlist or create a new playlist to be a seed playlist and request that content management system 105 recommend content items to complete the seed playlist.

Content management system 105 can generate a recommended sequence of one or more content items to add to a seed playlist. The recommended sequence of content items can include one or more content items determined to complement or sound pleasant played after the seed playlist. A user can thus create or select a partial playlist, and content management system 105 can select or recommend content items to complete the partial playlist.

Content management system 105 can recommend the content items based on an analysis of known playlists and an analysis of the seed playlist. For example, content management system 105 can analyze a training set of playlist records in playlist storage 170 to identify common patterns within the playlists. Such analysis can be performed using a variety of machine learning techniques; for example, in some embodiments a recurrent neural network is utilized. Content management system 105 can then identify a recommended sequence of one or more content items that would likely follow and sound pleasant performed after a sequence of content items defined by a seed playlist.

To accomplish this, content management system 105 can include language modeling module 130. Language modeling module 130 can be configured to use any of variety of machine learning techniques, such as a recurrent neural network to analyze playlists to identify patterns indicating sequences of content items commonly selected by users. For example, language modeling module 130 can analyze content attributes assigned to the content items to determine common content attribute sequences selected by users. From these identified patterns, language modeling module 130 can determine the likelihood that a particular sequence of content attributes will be found in a playlist created by a user, as well as the likelihood of any sequence of one more content items attributes following a playlist or partial playlist. Based on an assumption that users select content items and their sequential order within a playlist to result in a sequence of content items that is pleasant, language modeling module 130 can generate a recommended content attribute sequence that is pleasant when played after a seed playlist.

Language modeling module 130 can analyze playlists based on content attributes of the content items included in the playlists. Each content item can be assigned one or more content attributes that describe the content item. For example, a content item such as a song may be assigned content attributes that describe the tempo, mood and/or musical key of the song, as well as whether the song is in a major or minor key. As another example, a content item such as a video may be assigned content attributes that describe the brightness, mood, colors, genre, etc., of the video.

Data identifying the content attributes assigned to a content item can be included in content storage 160 and associated with the corresponding content item. Alternatively, data identifying content attributes assigned to a content item can be available from a third-party database (not shown) in network communication with content management system 105.

Language modeling module 130 can communicate with content storage 160 and/or a third-party database to gather data identifying the content attributes of content items included in playlists. Language modeling module 130 can use the gathered data to generate a content attribute sequence for one or more of the playlists in playlist storage 170. A content attribute sequence can be a sequence of content attributes that corresponds to the content items in a playlist and the sequential order of the playlist. Thus, a content attribute sequence can describe a playlist based on the content attributes of the content items in the playlist. For example, a content attribute sequence for a playlist of songs can describe the content attributes of the songs in the playlist in the sequential order in which the songs are positioned in the playlist (e.g., happy-bouncy-happy-soft-elegant).

Language modeling module 130 can store the generated content attribute sequences in content storage 160. As described, language modeling module 130 can analyze the generated content attribute sequences to create a statistical language model based on the content attributes of the content items in the playlists. The statistical language model can determine the likelihood that a particular sequence of content attributes will be found in a playlist created by a user, as well as the likelihood of any sequence of one more content item attributes following a seed playlist.

Language modeling module 130 can then use the statistical language model to generate recommended content attributes sequences based on a seed playlist provided by a user. For example, upon a user creating a new playlist to be a seed playlist or selecting an existing play list as a seed playlist, language modeling module 130 can gather the content attributes assigned to one or more of the content items in the seed playlist and use the gathered content attributes to generate a seed content attribute sequence for the seed playlist. Language modeling module 130 can then use the statistical language model and the generated seed content attribute sequence to generate a recommended content attribute sequence that would likely be selected by a user to follow the seed playlist.

Content management system 105 can use the recommended content attribute sequence to generate a recommended content item sequence to complete the seed playlist. For example, content management system 105 can include content item recommendation module 135 that is configured to generate a recommended content item sequence. A recommended content item sequence can include one or more content items selected and ordered based on a recommended content attribute sequence.

Content item recommendation module 135 can select content items that have content attributes that match or are similar to the content attributes in the recommended content item sequence and order the selected content items according to the order of the recommended content items sequence. For example, if the recommended content attribute sequence identifies a happy content item, followed by a bouncy content item, followed by another happy content item, content item recommendation module 135 can generate the recommended content item sequence by selecting two happy content items and one bouncy content item and then ordering the selected content items according to the recommended content attribute sequence (e.g., happy-bouncy-happy).

In some embodiments, content item recommendation module 135 can select content items from all of the content items available to the user (e.g., content items assigned to the user's account). Alternatively, in some embodiments, content item recommendation module 135 can select content items that are not assigned to the user's account as well as content items that are assigned to the users account. For example, content item recommendation module 135 can select from any and all content items in content storage 160 and/or a subset of content item in content storage 160 that are designated as being available for use to complete a seed playlist.

In some embodiments, content item recommendation module 135 can select a subset of content items as a set of candidate content items and then select content items for the recommended content item sequence from the set of candidate content items. Selecting a set of candidate content time can refine the content items that can be selected for the recommended content items sequence to exclude content items that are less likely to be of relevance to the user.

In some embodiments, content item recommendation module 135 can select the set of candidate content items based on one or more of the seed content items included in the seed playlist. For example, content item recommendation module 135 can select content items that are similar to the seed content items to include in the set of candidate content items. Content item recommendation module 135 can determine similarity based on a variety of factors, such as content items associated with a similar genre, artist, actors, author, era, style, etc.

In some embodiments, content item recommendation module 135 can select the set of content items based on a popularity score for the content items. Each content item can be associated with a popularity score indicating the popularity of the content item. The popularity score can be based on multiple factors such as the number of users that have the content items assigned to their user account, the number of times a content item has been played, etc. Content item recommendation module 135 can be configured to select content items with a popularity score above a specified threshold popularity score to include in the set of candidate content items. As a result, content items that may be irrelevant or obscure will not be selected for the recommended content item sequence.

As another example, content item recommendation module 135 can select content items for the set of candidate content items based on the release and/or creation date of the content items. Each content item can be associated with a release and/or creation data indicating the date the content item was created and/or released. For example, the release date associated with a song can indicate the date that the song was released for sale. Likewise, the creation date associated with a song can indicate the date the song was written. Content item recommendation module 135 can select content items that have a release and/or creation date that falls within a specified date range and/or that meet or are newer than a specified threshold date.

Content item recommendation module 135 can select content items from the set of candidate content items based on the content attributes of the candidate content items and the recommended content item attribute sequence. Further, in some embodiments, content item recommendation module 135 can also consider a set of content item selection rules when selecting candidate content items for the recommended content item sequence. The content item selection rules can identify one or more conditions or rules that must be met for the recommended content item sequence. For example, the content item selection rules can include conditions that limit the number of content items that can be in a playlist that are associated with the same artist, genre, etc. For example, the content item selection rules can set a condition that a playlist cannot include more than three songs by the same artist.

As another example, the content item selection rules can include a condition that content items associated with the same artist, genre, etc., be ordered at least a predetermined number of spaces apart from each other in the playlist. For instance, the content item selection rules can set a condition that songs by the same artist not be ordered to play consecutively or within two, three, etc., spaces from each other in the playlist.

As another example, the content item selection rules can include a condition that limits the number of content items with a popularity score beneath a predetermined threshold score from being included in the same playlist. Alternatively, the content item selection rules can include a condition that places a cap on the number of content items with a popularity score above a predetermined threshold score from being included in a playlist.

Content item recommendation module 135 can consider the seed content items in the seed playlist as well as the candidate content items in the set of candidate content items to select a recommended content items sequence that meets the content items selection rules as well as corresponds to the recommended content attribute sequence.

Content item recommendation module 135 can add the recommended content item sequence to the seed playlist. For example, content item recommendation module 135 can modify the playlist record for the seed playlist to include the recommended content items in the recommended content item sequence. As a result, the completed seed playlist can be presented to and made available to the user.

Alternatively, content item recommendation module 135 can provide the recommended content item sequence to the user as a recommendation, which the user can select to approve or deny. For example, content item recommendation module 135 can present the recommended content item sequence and enable the user to select to approve or deny one or more or all of the recommended content items. If the user denies one or more of the recommended content items, content item recommendation module 135 can select replacement content items based on the content item selection rules and/or the recommended content attribute sequence. This can include replacing only the denied content items or the denied content items and other content items in the recommended content item sequence. For example, a selected replacement content item may require content item recommendation module 135 to replace an additional content item to conform to the conditions dictated by the content item selection rules.

In some embodiments, content item recommendation module 135 can provide the user with multiple recommended content item sequences from which the user can select. For example, content item recommendation module can simultaneously present two or more recommended content item sequence and provide user interface elements, such as buttons, which the user can select to choose one of the presented recommended content item sequences.

In some embodiments, content item recommendation module 135 can generate a new recommended content item sequence based on the updated seed playlist. For example, upon a user approving a recommended content item sequence to be added to the seed playlist, content item recommendation module 135 can generate a new recommended content item sequence based on the combination of the seed playlist and the approved recommended content item sequence as a new seed playlist. Content item recommendation module 135 can prompt the user to select whether the user would like new content item recommendations to add to the playlist after the user accepts each recommended content item sequence, thereby enabling the user to continue to add to his playlist.

In some embodiments the content item recommendation module could be moved onto the client device 115 to allow the device to recommend content items based on a language model determined by the language modeling module 130. The language model could be sent to the client device 115 by the language modeling module 130 on content management system 105. This would facilitate faster playlist generation (no waiting for responses from a server), or offline playlist generation.

Figure 2:
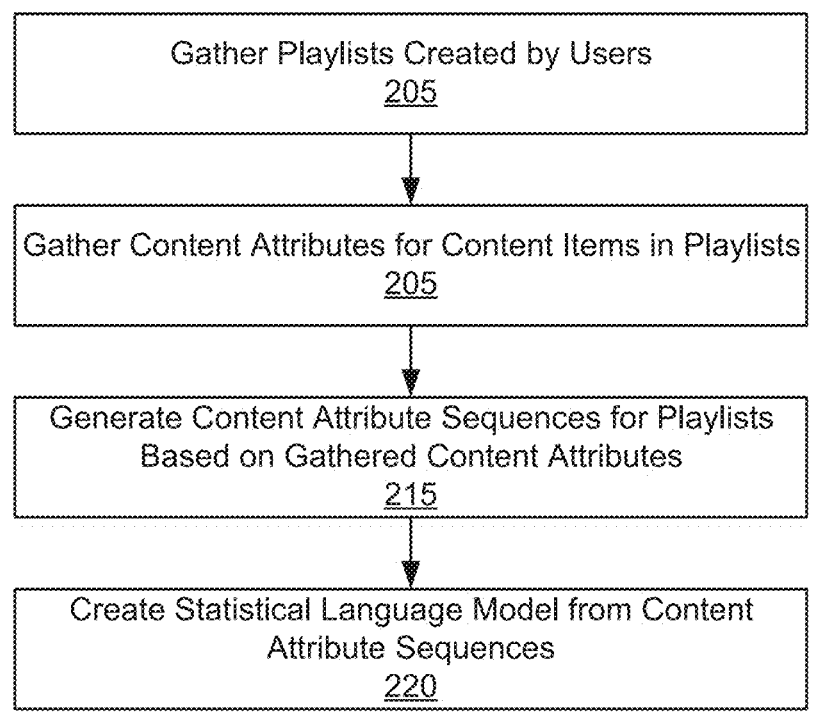
FIG. 2 shows a method for creating a statistical language model.

FIG. 2 shows a method for creating a statistical language model. The method shown in FIG. 2 is described in view of the system shown in FIG. 1. Although specific steps are shown in FIG. 2, in other embodiments the method may have more or less steps. Further, the order in which the steps are performed is just one possible embodiment and is not meant to be limiting. The method may be performed in a variety of differing orders, including one or more steps being performed simultaneously, and/or including more or less steps than those shown in FIG. 2.

At block 205, language modeling module 130 gathers playlists created by users. For example, language modeling module 130 can access playlist records from playlist storage 170. The playlist records can identify the content items included in the playlists as well as the sequential order of the content items within the playlist. For example, the playlist records can include content item identifiers that uniquely identify the content items in the playlist.

At block 210, language modeling module 130 can gather content attributes for content items in the playlists. Language modeling module 130 can gather the content attributes assigned to the content items from content storage 160. For example, language modeling module 130 can use the content item identifiers included in the playlist records to identify the content items in content storage 160 and gather the content attributes assigned to the content items. As another example, language modeling module 130 can gather the content attributes from a third-party server in network connection with content management system 105.

At block 215, language modeling module 130 can generate content attribute sequences for the playlists based on the gathered content attributes and the sequential order of the content items in the playlist. Each generated content attribute sequence can identify the content item attributes of the content items in the playlist in the sequential order in which their corresponding content items are positioned in the playlist.

At block 220, language modeling module 130 can create a statistical language module from the content attribute sequences. For example, language modeling module 130 can analyze the content attribute sequences to determine probabilities regarding the likelihood that a particular sequence of content attributes will be found in a playlist created by a user, as well as the likelihood of any sequence of one or more content attributes following a playlist or partial playlist created by a user. Language modeling module can then use the statistical language model to generate recommended content attribute sequences based on a seed playlist.

Figure 3:
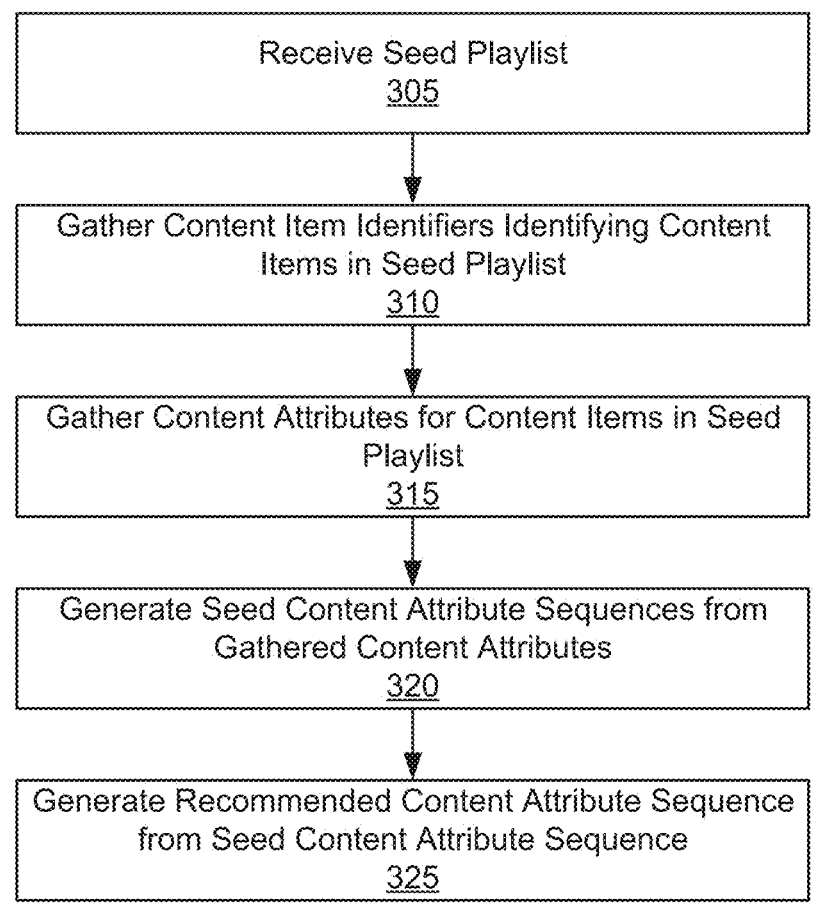
FIG. 3 shows a method of generating recommended content attribute sequence from a seed content attribute sequence.

FIG. 3 shows a method of generating recommended content attribute sequence from a seed content attribute sequence. The method shown in FIG. 3 is described in view of the system shown in FIG. 1. Although specific steps are shown in FIG. 3, in other embodiments the method may have more or less steps. Further, the order in which the steps are performed is just one possible embodiment and is not meant to be limiting. The method may be performed in a variety of differing orders, including one or more steps being performed simultaneously, and/or including more or less steps than those shown in FIG. 3.

At block 305, language modeling module 130 receives a seed playlist. A seed playlist can include one or more content items in a sequential order. In some embodiments, a seed playlist can be a partial playlist selected by a user. Receiving a seed playlist can include language modeling module 130 receiving a playlist identifier identifying the seed playlist. For example, playlist module 125 can enable a user to create or select a seed playlist and select to have the seed playlist completed by content management system 105, thereby causing playlist module 125 to transmit the playlist identifier for the seed playlist to language modeling module 130.

At block 310, language modeling module 130 can gather content item identifiers identifying the content items in the seed playlist. For example, language modeling module 130 can use the playlist identifier to access the corresponding playlist record in playlist storage 170. Language modeling module 130 can then gather the content item identifiers from the playlist record.

At block 315, language modeling module 130 can gather content attributes for the content items in the seed playlist. For example, language modeling module 130 can use the content item identifiers to identify the corresponding content items in content storage 160 and gather the content attributes assigned to each content item. Alternatively, language modeling module 130 can gather the content attributes from a third-party server in network communication with content management system 105.

At block 320, language modeling module 130 can generate a seed content attribute sequence from the gathered content attributes. The seed content attribute sequence can represent the seed playlist in terms of the content attributes of the content items in the seed playlist as well as the sequential order of the content items in the seed playlist.

At block 325, language modeling module 130 can generate a recommended content attribute sequence from the seed content attribute sequence. For example, language modeling module 130 can use the statistical language model to generate a recommended content attribute sequence that is likely to following the seed content attribute sequence. The seed content attribute sequence can then be used to generate a recommended content item sequence to complete a seed playlist.

Figure 4:
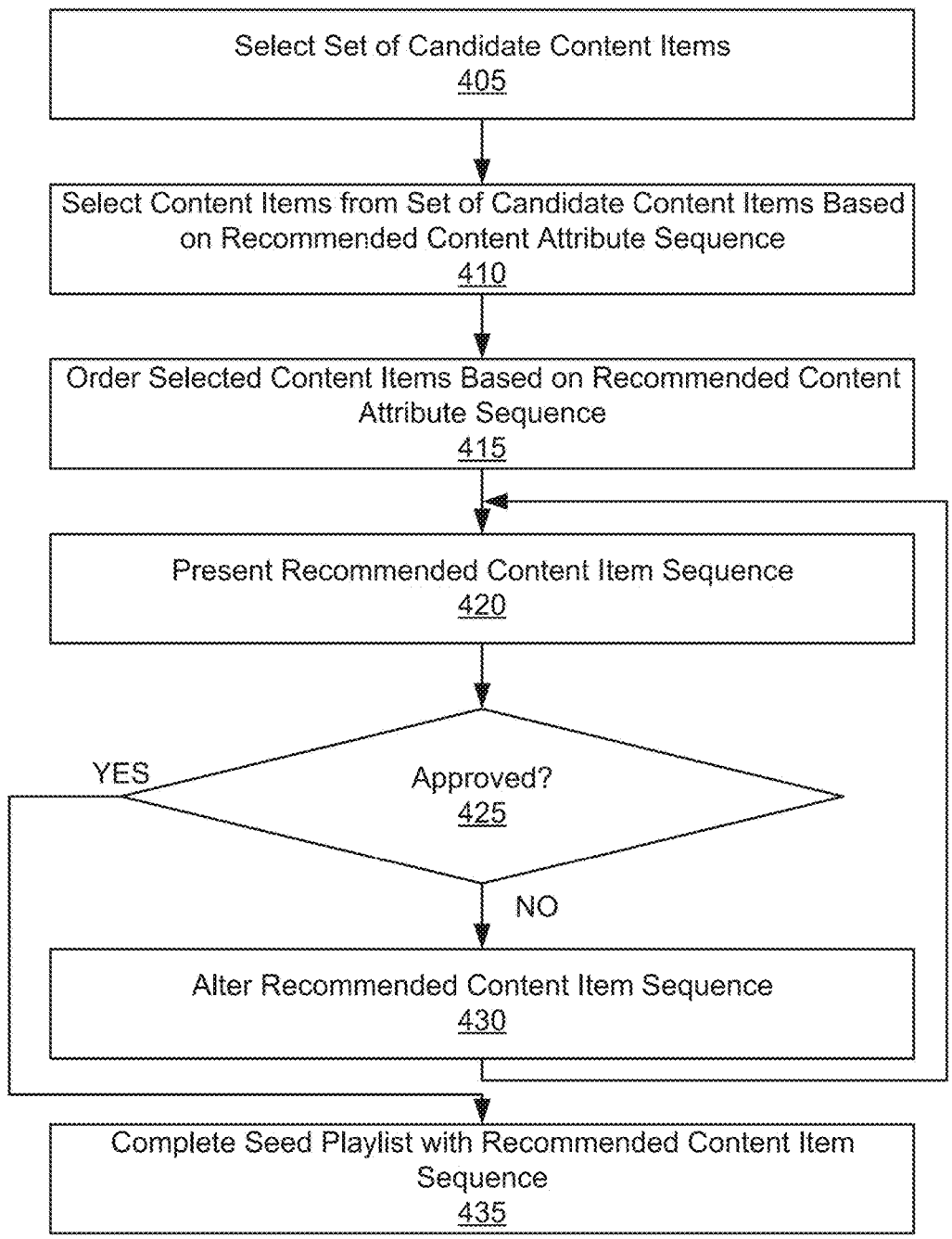
FIG. 4 shows a method of generating a recommended content item sequence based on a recommended content attribute sequence.

FIG. 4 shows a method of generating a recommended content item sequence based on a recommended content attribute sequence. The method shown in FIG. 4 is described in view of the system shown in FIG. 1. Although specific steps are shown in FIG. 4, in other embodiments the method may have more or less steps. Further, the order in which the steps are performed is just one possible embodiment and is not meant to be limiting. The method may be performed in a variety of differing orders, including one or more steps being performed simultaneously, and/or including more or less steps than those shown in FIG. 4.

At block 405, content item recommendation module 135 selects a set of candidate content items. Content item recommendation module 135 can select a set of candidate content items based on a variety of factors. For example, in some embodiments, content items recommendation module 135 can select content items based on content item preferences of the user. Content item recommendation module 135 can access the user's profile in user account storage 150 and gather the user's content item preferences from the user's profile.

A user's content item preferences can indicate the user's preferences regarding content items, such as the types of content items, genres, artists, styles, etc., that the user likes and dislikes. The user's content item preferences can include user provided preference data as well as preference data derived from the user's interactions with content items and the user's content library. For example, user interaction data indicating the content items the user has accessed the most, most recently, etc., can be used to derive the types of content items the user likes. Conversely, user interaction data indicating the content items the user has accessed the least can be used to derive the types of content items the user dislikes.

The user's content preferences can also be derived from the user's content library. For example, the content types, genres, artist, etc., that are most common and least common in the user's content library can be used to determine the user's likes and dislikes regarding content items.

Content item recommendation module 135 can select the set of candidate content items to include content items the user likes while not adding content items the user dislikes.

In some embodiments, content item recommendation module 135 can select the set of candidate content items based on a popularity score of the content items. For example, content item recommendation module 135 can select content items that have a popularity score that meets or exceeds a predetermined threshold popularity score.

In some embodiments, content item recommendation module 135 can select the set of candidate content items based on a creation and/or release date of the content items. For example, content item recommendation module 135 can select content items that have a creation and/or release date that falls within a specified data range and/or meets or is more recent than a specified threshold date.

In some embodiments, content item recommendation module 135 can select the set of candidate content items based on the content items in the seed playlist. Content item recommendation module 135 can select content items that are determined to be similar to the content items in the seed playlist. This can include content items that are similar to a content item profile describing the aggregate of the content items in the seed playlist and/or that are similar to any of the individual content items. For example, content item recommendation module 135 can rank content items based on a similarity score assigned to the content items that indicates the similarity of the content item to any one content item in the seed playlist and/or the content item profile describing the aggregate of the content items in the seed playlist. Content item recommendation module 135 can select a predetermined number of content items that have the highest similarity score (e.g., the top 100 content items) to be the set of candidate content items. Alternatively, content item recommendation module 135 can select all content items with a similarity score above a specified threshold similarity score to be the set of candidate content items.

At block 410, content item recommendation module 135 can select content items from the set of candidate content items based on the recommended content attribute sequence. The selected content items can result in a recommended content item sequence that will be pleasant to a user when added to the seed playlist. Content items selection module 135 can select content items that have content attributes that match or are similar to those in the recommended content attribute sequence. For example, if the recommended content attribute sequence dictates a sequence that includes a happy content item followed by a bouncy content item followed by another happy content item, content item recommendation module 135 can select two content items that are happy and one content item that is bouncy from the set of candidate content items.

In some embodiments, content item recommendation module 135 can select each content item from the set of candidate content items by ranking the candidate content items based on how well the content items attributes of the candidate content item match the content attributes described in the recommend content attribute sequence. Content items recommendation module 135 can then select the candidate content items based on the ranking (e.g., select the candidate content items ranked highest).

At block 415, content item recommendation module 135 can order the selected content items based on the recommended content attribute sequence. Content item recommendation module 135 can order the selected content items so that the order of the content items matches the recommended content item attribute sequence. For example, if the recommended content attribute sequence dictates a sequence of a happy content item followed by a bouncy content item followed by another happy content item, content item recommendation module 135 can order the selected content items to match the sequence (e.g., happy-bouncy-happy). Once ordered, the selected content items can represent a recommended content item sequence to complete the seed playlist.

In some embodiments, content item recommendation module 135 can also consider a set of content item selection rules when ordering the selected content items. The content item selection rules can identify one or more conditions or rules that must be met for the recommended content item sequence. For example, the content item selection rules can include conditions that limit the number of content items that can be in a playlist that are associated with the same artist, genre, etc. For example, the content item selection rules can set a condition that a playlist cannot include more than three songs by the same artist.

As another example, the content item selection rules can include a condition that content items associated with the same artist, genre, etc., be ordered at least a predetermined number of spaces apart from each other in the playlist. For instance, the content item selection rules can set a condition that songs by the same artist not be ordered to play consecutively or within two, three, etc., spaces from each other in the playlist.

At block 420, content item recommendation module 135 can present the recommended content item sequence to the user. For example, content item recommendation module 135 can present the user with data identifying the recommended content items and their order in the recommended content item sequence. Content item recommendation module 135 can further enable the user to select to approve or deny one or more of the content items in the recommend content item sequence. For example, content items recommendation module 135 can present the user with user interface elements enabling the user to select to approve or deny one or all of the content items in the recommended content item sequence.

At block 425, content item recommendation module 135 can determine whether the recommended content item sequence was approved or denied by the user. If at block 425, content item recommendation module 135 determines that the user denied one or more of the content items in the recommended content item sequence, the method can continue to block 430, where content item recommendation module 135 can alter the recommended content item sequence. This can include selecting new recommend content items to replace the denied content items as well as re-ordering the recommended content item sequence. The method can then return to block 420, where the altered recommend content item sequence can be presented to the user.

Alternatively, if at block 425, content item recommendation module 135 determines that the user approved the content item, the method continues to block 435 where playlist module 125 can add the recommended content item sequence to the seed playlist. For example, playlist module 125 can access the playlist record corresponding to the seed playlist and modify the playlist record to include the recommended content items. The user can then access, perform, etc., the seed playlist including the recommended content item sequence.

Figure 5A:
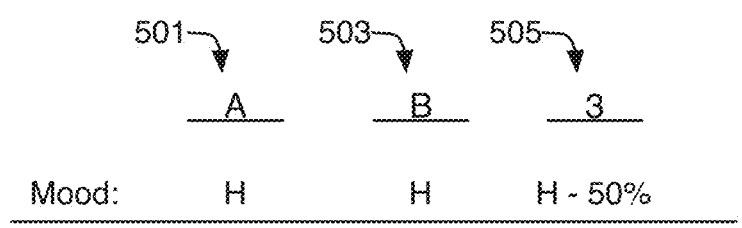
FIGS. 5A and 5B illustrates a conceptual example of a language model evaluating a next position in a playlist.
Figure 5B:
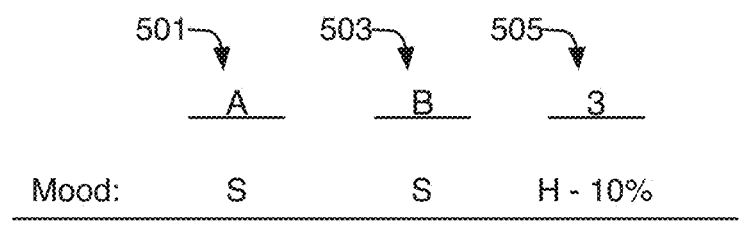

FIGS. 5A and 5B illustrate a conceptual example of a language model evaluating a next position in a playlist. In some embodiments, the language model is a probabilistic model representing probabilities that a media item with given characteristics will be found in a given location in a playlist from the training set of playlists.

FIG. 5A illustrates positions in a playlist: at the first position 501 is content item A, at the second position 503 is content item B, and position 3 505 is a position needing to be filled with a content item. The content items A and B that are already selected in positions in the playlist are associated with attributes Happy, and Happy, respectively. Based on the occurrence of two Happy content items in positions 501 and 503, the language model of the present technology can determine that the probability of a content item in position 505, i.e., the next content item in the list, having a mood of Happy is 50%. Of course such probability is conditional on the preceding content items in the playlist. As illustrated in FIG. 5B, content items A and B are now associated with attributes of Sad. Given that a media item for position 505 is preceded by two media items with an attribute of Sad, the probability that a content item with an attribute of Happy would occur next is only 10%.

While FIG. 5A and FIG. 5B illustrate only one attribute associated with each content item, it should be appreciated that the language model can evaluate multiple attributes at once. For example instead of informing that a content item at position 505 in FIG. 5A has a probability of having a mood of Happy is 50%, the language model could inform that the probability of having a content item being associated with the characteristics of a mood of Happy, a tempo of Fast, and a loudness of Loud at position 505 is 25%. Again this probability is conditioned on the characteristics associated with the preceding content items in the playlist.

While various characteristics are represented as discrete values for each characteristic, it is also possible that an actual implementation would represent the collection of these characteristics as continuous values, or a vector representing characteristics. Whether the characteristics are discrete, continuous, or a vector, they are attached to a probability of occurring given a prior content item, and given a location in a sequence. Further, while the figures included herein represent only a limited number of characteristics, many other characteristics can be included and represented in the vector.

Figure 5C:
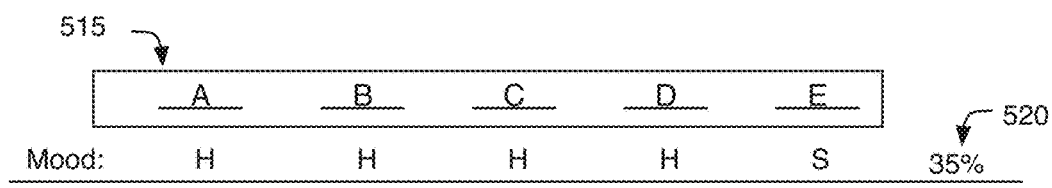
FIG. 5C illustrates a conceptual example of a language model evaluating an overall probability that a particular sequence of characteristics will occur.

In addition to determining the probability that a next content item in a sequence will have a given probability of having a particular attribute, FIG. 5C shows that the language model can also provide an overall probability that a particular sequence of characteristics will occur. As represented in FIG. 5C, a sequence 515 of content items is illustrated each having a characteristic mood. The language model of the present technology can further provide a probability 520 that this sequence of characteristics will occur. As illustrated in FIG. 5C, the language model informs that there is a 35% probability that a sequence of content items having characteristics in an order of H, H, H, H, S will occur.

As addressed above, in some embodiments, the language model can be used to determine and suggest a set of candidate content items for a given position in the playlist. The suggested set of candidate items is based on a probability that a content item will follow the earlier content items (the seed content items), and also based on how a candidate content item fits within the overall flow of the playlist (recommended content attribute sequence).

Figure 6A:
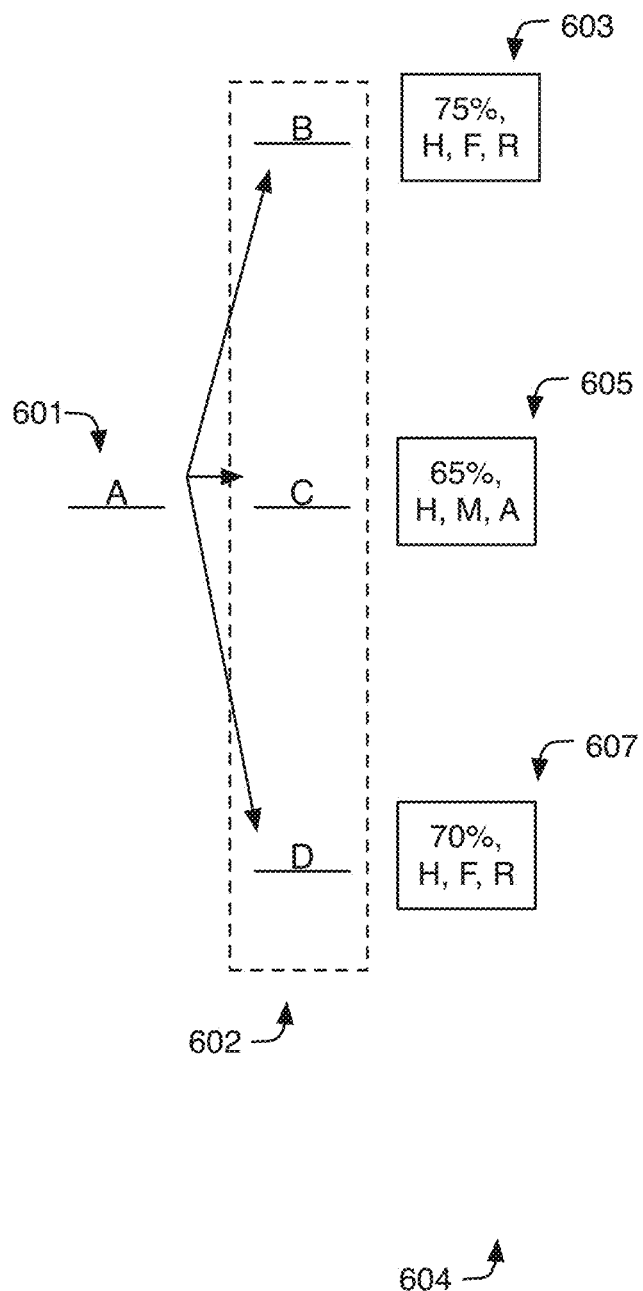
FIGS. 6A, 6B, and 6C demonstrate an example of how a candidate content item is not only determined to be a candidate based on seed content item(s), but also how the recommended content attribute sequence is used to determine candidates for a position in the playlist.
Figure 6B:
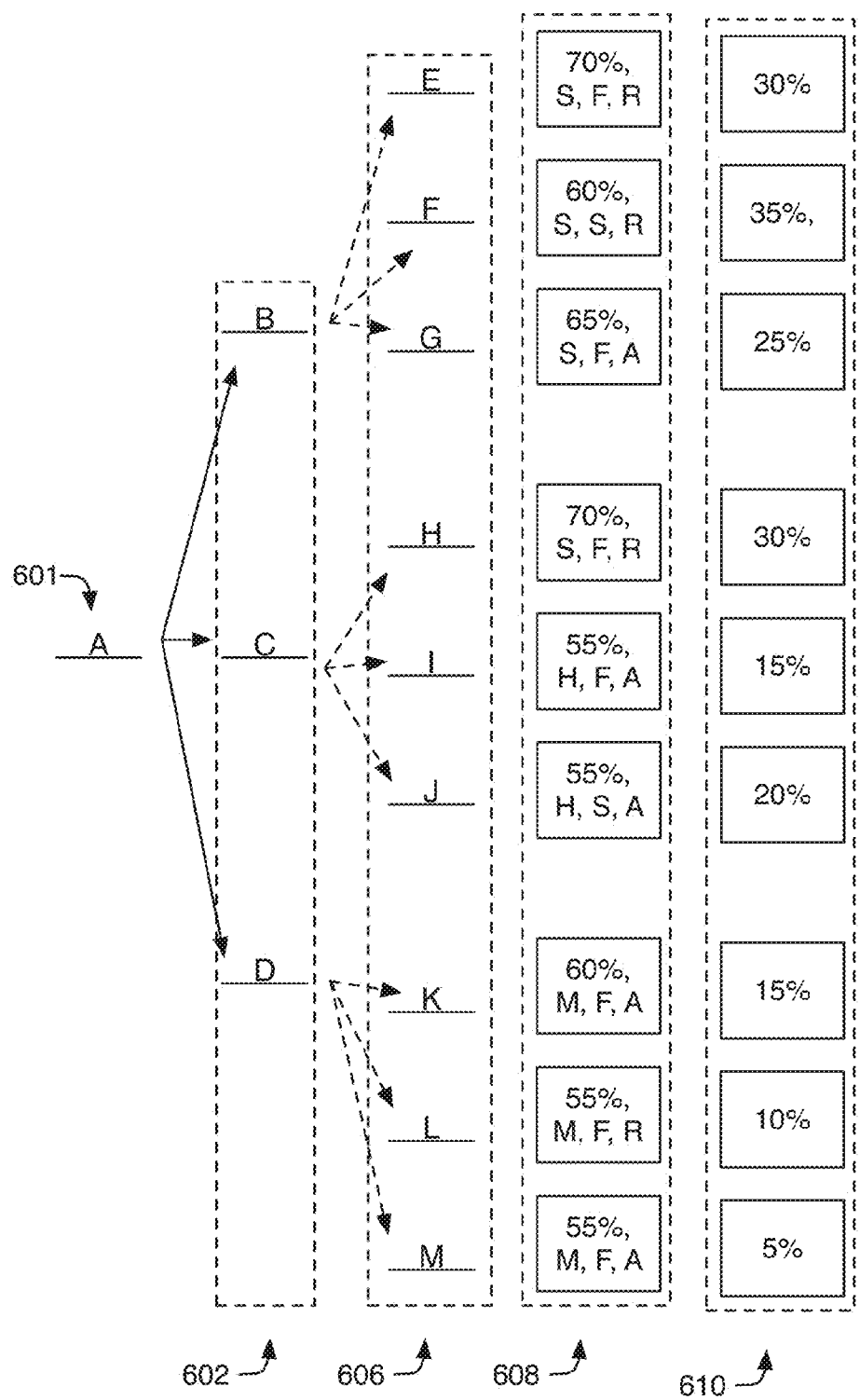
Figure 6C:
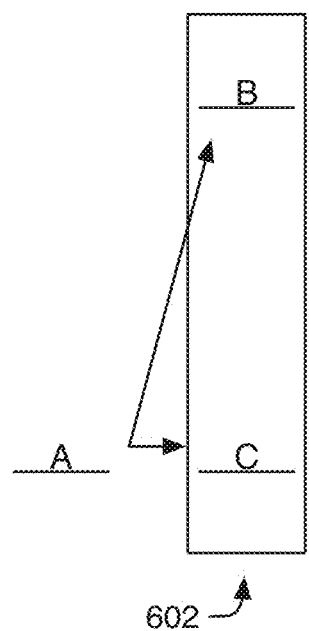

FIGS. 6A, 6B, and 6C demonstrate one example of how a candidate content item is not only determined to be a candidate based on seed content item(s), but also how the recommended content attribute sequence is used to determine candidates for a position in the playlist. In FIGS. 6A, 6B, and 6C a technique known as beam search is applied to determine candidate content items. As is know in the art beam search is a heuristic search algorithm that explores a graph by expanding the most promising node in a limited set. Beam search uses breadth-first search to build its search tree. At each level of the tree, it generates all successors of the states at the current level, sorting them in increasing order of heuristic cost. However, it only stores a predetermined number of best states at each level (called the beam width). Only those states are expanded for the next level of the search tree. (en.wikipedia.org/wiki/Beam_search). However, the present technology is not limited to this technique. These figures and this embodiment are provided for descriptive purposes only, and are not meant to limiting. Many other mechanisms of applying a language model in playlist generation may be apparent to those of skill in the art when informed by the descriptions herein.

FIG. 6A illustrates using a beam search with a beam width of three to determine candidate content items for position 2 602 when give a seed content item A 601.

As addressed above, a component in identifying a candidate content item is how similar the content item is to a prior content item, or the seed content item(s). Thus a similarity threshold can be applied to collect initial candidates before applying the language model. Alternatively, as the probabilities are conditional on earlier selected content items, the similarity score for candidate can be incorporated into a vector representing that content item and that vector can be compared to the vector representing the relevant position in the playlist for which candidates are being suggested.

It will be appreciated by those of skill in the art that if a collection of content items from which the candidates are being selected is large, that there will be ample candidates. In fact, there will likely be more candidates than can be analyzed. Accordingly a simple randomization algorithm can be used to select a few candidates of the total pool of possible candidates.

As illustrated in FIG. 6A, it has been determined that content items B, C, and D, are potential candidates for position 2 in the playlist. All content items are sufficiently similar to candidate A, and match the language model close enough that they could work in the playlist being built using the present technology.

Of potential candidate content items B, C, and D, B has characteristics that are 75% 603 likely to follow A in a playlist; C has characteristics that are 65% 605 likely to follow A in a playlist; and C has characteristics that are 70% 607 likely to follow A in a playlist.

Rather than recommending these three content items as they are all a fit for the position, or selecting content item B as the best fit, the present technology next looks further down the potential playlist to determine if the candidates result in a good playlist sequence overall. It may be that the best fit candidate B leads to a poor playlist when considering the full recommended content attribute sequence for a playlist several positions further out in the playlist. If such were determined, candidate B shouldn't be recommended, so the beam search continues to make this determination.

FIG. 6B illustrates the next level in a tree using a beam search with a band of 3. Thus seed content item A 601 is represented in the first position, potential candidates for position 2 602, content items B, C, D, are shown in position 2, and each of B, C, D leads to three additional candidates for position 3 606.

Candidates for position 3 606 are illustrated next to their probabilities of occurring 608 following the content item immediately preceding it, and the probability that the entire sequence would occur 610. As in FIG. 6A the probabilities for occurring 608 are based on the probability that a content item with the characteristics listed for the content item would follow a content item 602 having its associated characteristics. Specifically, the probability that content item E would follow content item B is 70%, that F would follow content item B is 60%, and that G would follow content item B is 65%. The same is true for candidates following content item C. The probability that content item H would follow content item C is 70%, that I would follow content item C is 55%, and that J would follow content item C is 55%. The probability that content item K would follow content item D is 60%, that L would follow content item D is 55%, and that M would follow content item D is 55%.

The present technology also analyzes the full sequence to determine if the full sequence is likely to occur. FIG. 6B shows the probability of a sequence as 610. Specifically, the probability of a sequence of content items that has the attributes associated with A in the first position, B in the second position, and E in the third position occurring is 30%. The probability of a sequence of content items A-B-F occurring is 35%. The probability of a sequence of content items A-B-G occurring is 25%. The probability of a sequence of content items A-C-H occurring is 30%, and so on.

By analyzing the full sequence it can be determined that selection of a given candidate at position 602 is unlikely to result in a good play list. For example, assuming that a sequence of content items must be at least 30% likely to occur in order to be considered a good playlist, it can be seen in FIG. 6B that only candidates B and C at position 2 602, can potentially lead to an acceptable playlist sequence because all sequences resulting from candidate D result in a sequence through position 3 608 that are below the 30% threshold for being an acceptable playlist.

In FIG. 6C, only candidates B and C remain in position 2 602, and D has been eliminated from the candidate list because D did not result in a playlist that contained media items having a sequence that was likely enough to result in a good playlist. Candidates B and C can thus be presented as candidates for position 2 in a playlist. A user may select one of these candidates, and the present technology begins again to identify candidates for the next position in the playlist.

While FIG. 6B only illustrates the beam search going to one position further in the playlist than the position for which candidates are being considered, the beam search could go a greater number of positions. In such an instance, it is possible that the sequence of content items stemming from candidate D eventually turn into a good playlist. In such instances candidate D would be a viable candidate.

Further, while FIG. 6A, 6B, 6C, were discussed in the context of determining candidates to recommend to a user for each position in a playlist, the present technology could utilize the results of the beam search to select the best beam in its entirety and present a completed playlist to the user.

Figure 7:
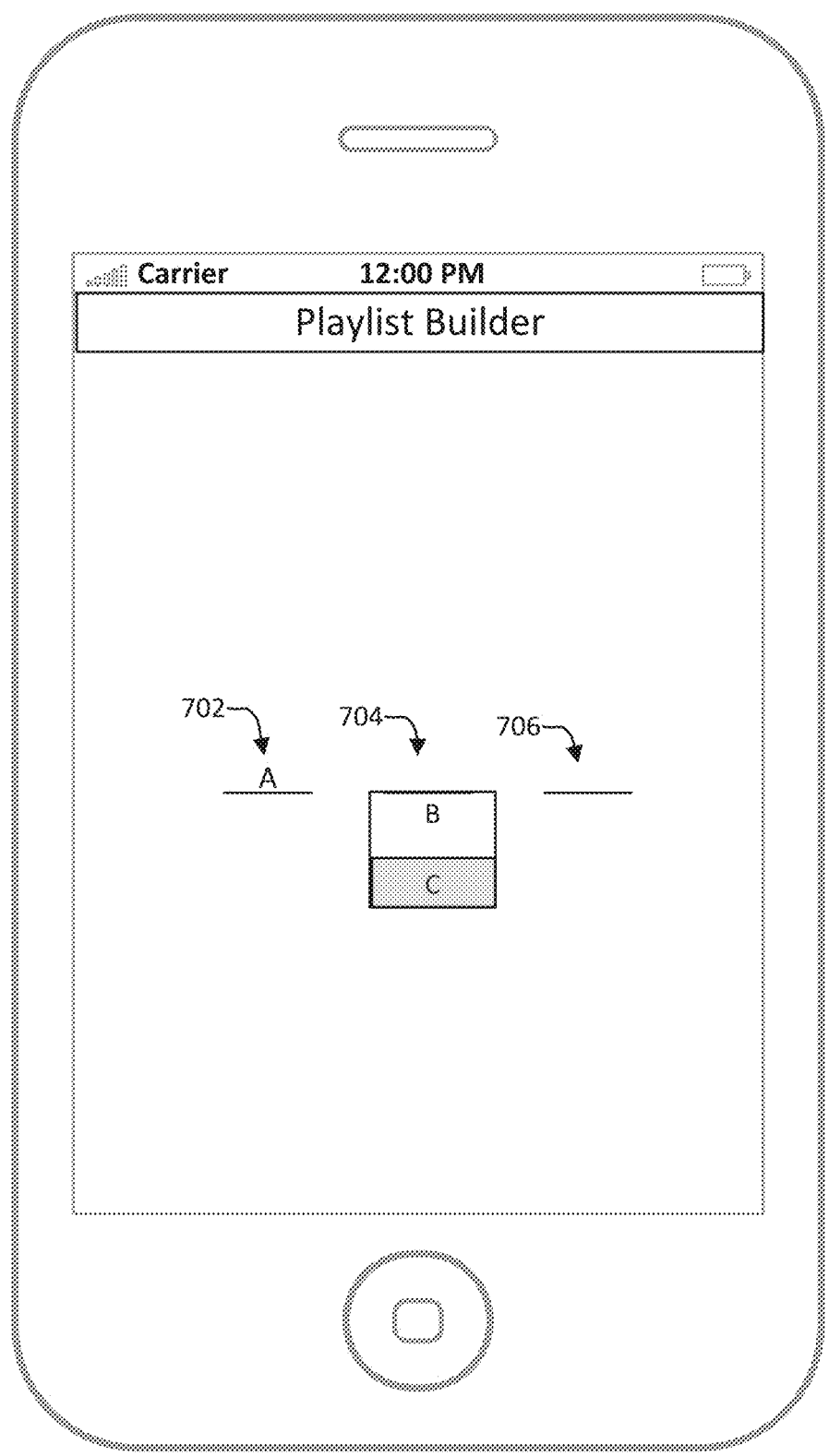
FIG. 7 illustrates an example graphical user interface of a playlist builder.

FIG. 7 illustrates an example graphical user interface of a playlist builder. As illustrated content item A is the seed content item at position 702, and using the above described technology, it has been determined that content items B and C are good candidates for position 704. Once one of the candidate content items is selected for position 704, the graphical user interface can present candidates for position 706 depending on the existing sequence of content items, which can be new seed items.

FIG. 8A, and FIG. 8B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 8A illustrates a conventional system bus computing system architecture 800 wherein the components of the system are in electrical communication with each other using a bus 805. Exemplary system 800 includes a processing unit (CPU or processor) 810 and a system bus 805 that couples various system components including the system memory 815, such as read only memory (ROM) 820 and random access memory (RAM) 825, to the processor 810. The system 800 can include a cache of high-speed memory connected directly with, in close proximity to, or integrated as part of the processor 810. The system 800 can copy data from the memory 815 and/or the storage device 830 to the cache 812 for quick access by the processor 810. In this way, the cache can provide a performance boost that avoids processor 810 delays while waiting for data. These and other modules can control or be configured to control the processor 810 to perform various actions. Other system memory 815 may be available for use as well. The memory 815 can include multiple different types of memory with different performance characteristics. The processor 810 can include any general purpose processor and a hardware module or software module, such as module 1 832, module 2 834, and module 3 836 stored in storage device 830, configured to control the processor 810 as well as a special-purpose processor where software instructions are incorporated into the actual processor design. The processor 810 may essentially be a completely self-contained computing system, containing multiple cores or processors, a bus, memory controller, cache, etc. A multi-core processor may be symmetric or asymmetric.

To enable user interaction with the computing device 800, an input device 845 can represent any number of input mechanisms, such as a microphone for speech, a touch-sensitive screen for gesture or graphical input, keyboard, mouse, motion input, speech and so forth. An output device 835 can also be one or more of a number of output mechanisms known to those of skill in the art. In some instances, multimodal systems can enable a user to provide multiple types of input to communicate with the computing device 800. The communications interface 840 can generally govern and manage the user input and system output. There is no restriction on operating on any particular hardware arrangement and therefore the basic features here may easily be substituted for improved hardware or firmware arrangements as they are developed.

Storage device 830 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 825, read only memory (ROM) 820, and hybrids thereof.

The storage device 830 can include software modules 832, 834, 836 for controlling the processor 810. Other hardware or software modules are contemplated. The storage device 830 can be connected to the system bus 805. In one aspect, a hardware module that performs a particular function can include the software component stored in a computer-readable medium in connection with the necessary hardware components, such as the processor 810, bus 805, display 835, and so forth, to carry out the function.

FIG. 8B illustrates a computer system 850 having a chipset architecture that can be used in executing the described method and generating and displaying a graphical user interface (GUI). Computer system 850 is an example of computer hardware, software, and firmware that can be used to implement the disclosed technology. System 850 can include a processor 855, representative of any number of physically and/or logically distinct resources capable of executing software, firmware, and hardware configured to perform identified computations. Processor 855 can communicate with a chipset 860 that can control input to and output from processor 855. In this example, chipset 860 outputs information to output 865, such as a display, and can read and write information to storage device 870, which can include magnetic media, and solid state media, for example. Chipset 860 can also read data from and write data to RAM 875. A bridge 880 for interfacing with a variety of user interface components 885 can be provided for interfacing with chipset 860. Such user interface components 885 can include a keyboard, a microphone, touch detection and processing circuitry, a pointing device, such as a mouse, and so on. In general, inputs to system 850 can come from any of a variety of sources, machine generated and/or human generated.

Chipset 860 can also interface with one or more communication interfaces 890 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 855 analyzing data stored in storage 870 or 875. Further, the machine can receive inputs from a user via user interface components 885 and execute appropriate functions, such as browsing functions by interpreting these inputs using processor 855.

It can be appreciated that exemplary systems 800 and 850 can have more than one processor 810 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method comprising:
   receiving, by a computer processor, data identifying a set of seed content items and a sequential order for the set of seed content items, wherein the set of seed content items includes at least one seed content item included in a first content item playlist, and the sequential order indicates an order in which seed content items from the set of seed content items are ordered to be performed in the first content item playlist;
   generating, by the computer processor, a seed content attribute sequence based on attributes of at least a first seed content item of the set of seed content items and the sequential order for the set of seed content items;
   generating, by the computer processor, a recommended content attribute sequence that is likely to follow the seed content attribute sequence, the recommended content attribute sequence determined from the seed content attribute sequence and a statistical language model based on an analysis of a set of reference content attribute sequences, wherein the set of reference content attribute sequences were generated from a set of user created content playlists; and
   selecting, by the computer processor, a set of recommended content items to be added to the first content item playlist and performed sequentially after the set of seed content items in a recommended sequential order, the set of recommended content item and the recommended sequential order selected based on content attributes of the set of recommended content items and the recommended content attribute sequence.

2. The method of claim 1, further comprising:
   selecting a subset of a set of available content times yielding a set of candidate content items, wherein the first recommended content item is selected from the set of candidate content items.

3. The method of claim 2, further comprising:
   determining a set of similarity rankings indicating similarity between content items in the set of available content items and at least one seed content item, wherein the selecting the subset of available content items is based on the set of similarity rankings.

4. The method of claim 2, further comprising:
   gathering content preferences data describing a human user's preferences for content items, the human user having selected the set of seed content items, wherein the selecting the subset of available content items is based on the content preferences.

5. The method of claim 1, further comprising:
   receiving a denial message indicating that a human user has denied at least a first recommended content item of the set of recommended content items; and
   generating an updated set of recommend content items, the updated set of recommended content item including an updated recommended content item in place of the first recommend content item, wherein the updated content item is not included in the set of recommended content items.

6. The method of claim 1, further comprising:
   modifying the first content item playlist to include the set of recommended content item sequence, the set of recommended content items ordered in the first content item playlist to be performed after the set of seed content items and in the recommended sequential order.

7. The method of claim 1, further comprising:
   gathering content item attributes for content items included in the set of user created content playlists; and
   generating the set of reference content attribute sequences based on the content item attributes for content items included in the set of user created content playlists and a set of sequential orders associated with the user created playlist, each sequential order of the set of sequential orders describing the order of content items in one of the user created playlists.

8. A system comprising:
   a computer processor; and
   a memory containing instructions that, when executed cause the computer processor to:
   receive data identifying a set of seed content items and a sequential order for the set of seed content items, wherein the set of seed content items includes at least one seed content item included in a first content item playlist, and the sequential order indicates an order in which seed content items from the set of seed content items are ordered to be performed in the first content item playlist;
   generate a seed content attribute sequence based on attributes of at least a first seed content item of the set of seed content items and the sequential order for the set of seed content items;
   generate a recommended content attribute sequence that is likely to follow the seed content attribute sequence, the recommended content attribute sequence determined from the seed content attribute sequence and a statistical language model based on an analysis of a set of reference content attribute sequences, wherein the set of reference content attribute sequences were generated from a set of user created content playlists; and
   select a set of recommended content items to be added to the first content item playlist and performed sequentially after the set of seed content items in a recommended sequential order, the set of recommended content item and the recommended sequential order selected based on content attributes of the set of recommended content items and the recommended content attribute sequence.

9. The system of claim 8, wherein the instructions further cause the computer processor to:
select a subset of a set of available content times yielding a set of candidate content items, wherein the first recommended content item is selected from the set of candidate content items.

10. The system of claim 9, wherein the instructions further cause the computer processor to:
determine a set of similarity rankings indicating similarity between content items in the set of available content items and at least one seed content item, wherein the selecting the subset of available content items is based on the set of similarity rankings.

11. The system of claim 9, wherein the instructions further cause the computer processor to:
gather content preferences data describing a human user's preferences for content items, the human user having selected the set of seed content items, wherein the selecting the subset of available content items is based on the content preferences.

12. The system of claim 8, wherein the instructions further cause the computer processor to:
receive a denial message indicating that a human user has denied at least a first recommended content item of the set of recommended content items; and
generate an updated set of recommend content items, the updated set of recommended content item including an updated recommended content item in place of the first recommend content item, wherein the updated content item is not included in the set of recommended content items.

13. The system of claim 8, wherein the instructions further cause the computer processor to:
modify the first content item playlist to include the set of recommended content item sequence, the set of recommended content items ordered in the first content item playlist to be performed after the set of seed content items and in the recommended sequential order.

14. The system of claim 8, wherein the instructions further cause the computer processor to:
gather content item attributes for content items included in the set of user created content playlists; and
generate the set of reference content attribute sequences based on the content item attributes for content items included in the set of user created content playlists and a set of sequential orders associated with the user created playlist, each sequential order of the set of sequential orders describing the order of content items in one of the user created playlists.

15. A non-transitory computer-readable medium containing instructions that, when executed by a computer processor, cause the computer processor to:
receive data identifying a set of seed content items and a sequential order for the set of seed content items, wherein the set of seed content items includes at least one seed content item included in a first content item playlist, and the sequential order indicates an order in which seed content items from the set of seed content items are ordered to be performed in the first content item playlist;
generate a seed content attribute sequence based on attributes of at least a first seed content item of the set of seed content items and the sequential order for the set of seed content items;
generate a recommended content attribute sequence that is likely to follow the seed content attribute sequence, the recommended content attribute sequence determined from the seed content attribute sequence and a statistical language model based on an analysis of a set of reference content attribute sequences, wherein the set of reference content attribute sequences were generated from a set of user created content playlists; and
select a set of recommended content items to be added to the first content item playlist and performed sequentially after the set of seed content items in a recommended sequential order, the set of recommended content item and the recommended sequential order selected based on content attributes of the set of recommended content items and the recommended content attribute sequence.

16. The non-transitory computer-readable medium of claim 15, wherein the instructions further cause the computer processor to:
select a subset of a set of available content times yielding a set of candidate content items, wherein the first recommended content item is selected from the set of candidate content items.

17. The non-transitory computer-readable medium of claim 16, wherein the instructions further cause the computer processor to:
determine a set of similarity rankings indicating similarity between content items in the set of available content items and at least one seed content item, wherein the selecting the subset of available content items is based on the set of similarity rankings.

18. The non-transitory computer-readable medium of claim 16, wherein the instructions further cause the computer processor to:
gather content preferences data describing a human user's preferences for content items, the human user having selected the set of seed content items, wherein the selecting the subset of available content items is based on the content preferences.

19. The non-transitory computer-readable medium of claim 15, wherein the instructions further cause the computer processor to:
receive a denial message indicating that a human user has denied at least a first recommended content item of the set of recommended content items; and
generate an updated set of recommend content items, the updated set of recommended content item including an updated recommended content item in place of the first recommend content item, wherein the updated content item is not included in the set of recommended content items.

20. The non-transitory computer-readable medium of claim 15, wherein the instructions further cause the computer processor to:
modify the first content item playlist to include the set of recommended content item sequence, the set of recommended content items ordered in the first content item playlist to be performed after the set of seed content items and in the recommended sequential order.

21. The non-transitory computer-readable medium of claim 15, wherein the instructions further cause the computer processor to:

gather content item attributes for content items included in the set of user created content playlists; and generate the set of reference content attribute sequences based on the content item attributes for content items included in the set of user created content playlists and a set of sequential orders associated with the user created playlist, each sequential order of the set of sequential orders describing the order of content items in one of the user created playlists.

* * * * *